(12) United States Patent
Orlych

(10) Patent No.: US 10,766,226 B2
(45) Date of Patent: Sep. 8, 2020

(54) PET RELEASE LINER

(71) Applicant: Inteplast Group Corporation, Livingston, NJ (US)

(72) Inventor: George Orlych, Barrington, NH (US)

(73) Assignee: Inteplast Group Corporation, Livingston, NJ (US)

( * ) Notice: Subject to any disclaimer, the term of this patent is extended or adjusted under 35 U.S.C. 154(b) by 102 days.

(21) Appl. No.: 15/968,113

(22) Filed: May 1, 2018

(65) Prior Publication Data

US 2019/0337263 A1  Nov. 7, 2019

(51) Int. Cl.
| | |
|---|---|
| *B32B 7/06* | (2019.01) |
| *B32B 27/08* | (2006.01) |
| *B32B 27/20* | (2006.01) |
| *B32B 27/32* | (2006.01) |
| *B32B 27/36* | (2006.01) |
| *E04D 5/10* | (2006.01) |
| *B32B 7/14* | (2006.01) |
| *C09J 7/40* | (2018.01) |

(52) U.S. Cl.
CPC ............... *B32B 7/06* (2013.01); *B32B 7/14* (2013.01); *B32B 27/08* (2013.01); *B32B 27/20* (2013.01); *B32B 27/32* (2013.01); *B32B 27/36* (2013.01); *C09J 7/403* (2018.01); *C09J 7/405* (2018.01); *E04D 5/10* (2013.01); *B32B 2250/05* (2013.01); *B32B 2250/24* (2013.01); *B32B 2255/26* (2013.01); *B32B 2307/4026* (2013.01); *B32B 2307/71* (2013.01); *B32B 2307/7242* (2013.01); *B32B 2307/7265* (2013.01); *B32B 2419/06* (2013.01)

(58) Field of Classification Search
CPC ......... B32B 27/32; B32B 27/36; B32B 27/08; E04D 5/10; E04D 5/12; Y10T 428/14; Y10T 428/141; Y10T 428/1476; C09J 7/22; C09J 7/29; C09J 7/40; C09J 7/403; C09J 7/405
USPC ................................................ 428/41.3, 41.8
See application file for complete search history.

(56) References Cited

U.S. PATENT DOCUMENTS

| | | |
|---|---|---|
| 7,097,881 B2 | 8/2006 | Bednarik et al. |
| 7,618,700 B2 | 11/2009 | Furst |
| 9,273,234 B2 | 3/2016 | Schmitzer et al. |
| 9,623,630 B2 | 4/2017 | Engelhard |
| 2013/0034676 A1* | 2/2013 | Casebolt ............ C09J 7/21 428/41.3 |

* cited by examiner

*Primary Examiner* — Catherine A. Simone
(74) *Attorney, Agent, or Firm* — Lerner, David, Littenberg, Krumholz & Mentlik, LLP

(57) ABSTRACT

A multilayer release liner for use in a roofing system. that includes a roofing membrane and an asphalt or bitumen adhesive. The multilayer release liner contains a core layer including PET, surrounded by several outer layers including at least two tie layers adhered to the core layer, and at least two polyolefin layers adhered to the tie layers. The multilayer release liner of the present invention is highly compatible with silicone and does not contain any ingredients that may interfere with the adhesion or cure of a silicone coating. The liner of the present invention also provides an effective oil barrier and minimizes oil migration and discoloration of the multilayer release liner from the adhesives used in roofing systems.

15 Claims, 3 Drawing Sheets

PET RELEASE LINER

BACKGROUND OF THE INVENTION

Traditional roofing materials are made up of two main components: a roofing membrane and an adhesive. Conventional adhesives are compounds derived from petroleum and are typically asphalt or bitumen compounds. The traditional application method for these materials was to first apply the adhesive to the surface of a roof and then to roll or stick the roofing membrane over the top of the adhesive. Asphalt or bitumen adhesives needed to be fluidized before application which required the use of processes such as hot mopping, open-flame torching, or the use of solvent-based cold process adhesives. These methods proved undesirable because they led to the release of fumes, odors, volatile organic compounds and created fire hazards. Such methods also require a higher level of skill and supervision for roofing workers in order to minimize safety risks and improper installation.

Self-adhering roofing systems provide an improvement on traditional roofing materials. As opposed to traditional roofing systems, self-adhering roofing systems contain three main components: a roofing material made up of a roofing membrane and a roofing adhesive, a silicone release coating, and a release liner. Roofing adhesives are typically petroleum products made up of asphalt or bitumen compounds. These adhesives are applied to a roofing membrane and then covered with a release liner coated with a silicone release coating on the surface of the release liner which contacts the roofing material. In this way, the release liner protects the roofing adhesive before use and prevents sticking. The three-layer roofing system is typically formed into rectangular strips and sold rolled into cylinders. For application, the roofing material is unrolled onto the roof, adhesive side down, and the release liner is removed, exposing the adhesive. These systems are preferred by builders in the industry and are fast becoming the industry standard because they reduce safety risks, are environmentally safe, and take less skill to apply.

Due to the widespread use of self-adhering roofing systems, there is a need in the industry for high functioning release liners. Specifically, effective release liners must remain adhered to the adhesive of the roofing material for long periods of time during storage, transport, and sale. It is important that the release liner maintains its adhesive ability throughout the interim between manufacture and use of the roofing system. Furthermore, release liners must not interact with or absorb portions of the roofing adhesive, or materials from other layers of the self-adhering roofing systems which can cause staining of the release liner and/or lower the effectiveness of the adhesive.

Petroleum based roofing adhesives contain oil components which are prone to migration into conventional release liners. Such oil migration can cause staining of the release liner, which is unsightly and may deter buyers as it signifies an inferior product to consumers. Furthermore, oil migration into the release liner may cause the adhesive to lose its stickiness and adhesive ability. These problems are exacerbated in warm or hot temperatures, which decrease the viscosity of the asphalt or bitumen adhesives and increase oil diffusion rates. As self-adhering roofing systems may be installed in warm, sunny, or even hot weather conditions, release liners that minimize oil migration are particularly advantageous.

BRIEF SUMMARY OF THE INVENTION

In one embodiment, a multilayer release liner for a roofing material is provided, which comprises a core layer comprising polyethylene terephthalate (PET) having a first side and a second side; a first tie layer disposed upon the first side of the core layer and a second tie layer disposed upon the second side of the core layer; and a first polyolefin layer disposed on the first tie layer and a second polyolefin layer disposed on the second tie layer; wherein the PET is present in the core layer in an amount of at least 50 wt % based on the total weight of the core layer.

In one embodiment, the multilayer release liner further comprises a third polyolefin layer disposed on top of the first polyolefin layer and a fourth polyolefin layer disposed on top of the second polyolefin layer.

In one embodiment, the PET is present in the core layer in an amount of at least 95 wt % based on the total weight of the core layer. In another embodiment, the core layer of PET. In some embodiments, the core layer minimizes oil migration. In one embodiment, a thickness of the core layer is within a range of about 4% to about 40% of a thickness of the multilayer release liner.

In one embodiment, a thickness of all of the tie layers combined is within a range of about 4% to about 40% of the thickness of the multilayer release liner.

In one embodiment, at least one of the polyolefin layers further comprises an additive. In some embodiments, the additive is selected from the group consisting of a filler, a colorant, a stabilizer, a processing agent, and an antiblocking agent. In other embodiments, the polyolefin layers do not include a reinforcing fiber, a coupling agent, a plasticizer, a flame retardant, a peroxide, or an antistat. In an embodiment, a thickness of all of the polyolefin layers is within a range of about 25% to about 50% of the thickness of the multilayer release liner.

In one embodiment, a self-adhering roofing system is provided, which includes a multilayer release liner, a roofing material, and a silicone release coating. In some embodiments, the self-adhering roofing system is shelf-stable for at least 6 months at room temperature.

In some embodiments, the silicone release coating does not contain microparticles. In some embodiments, a thickness of the silicone release coating is within the range of about 1 to about 5 microns (µm).

In some embodiments, the multilayer release liner is silicone compatible.

DETAILED DESCRIPTION

Figure 1:
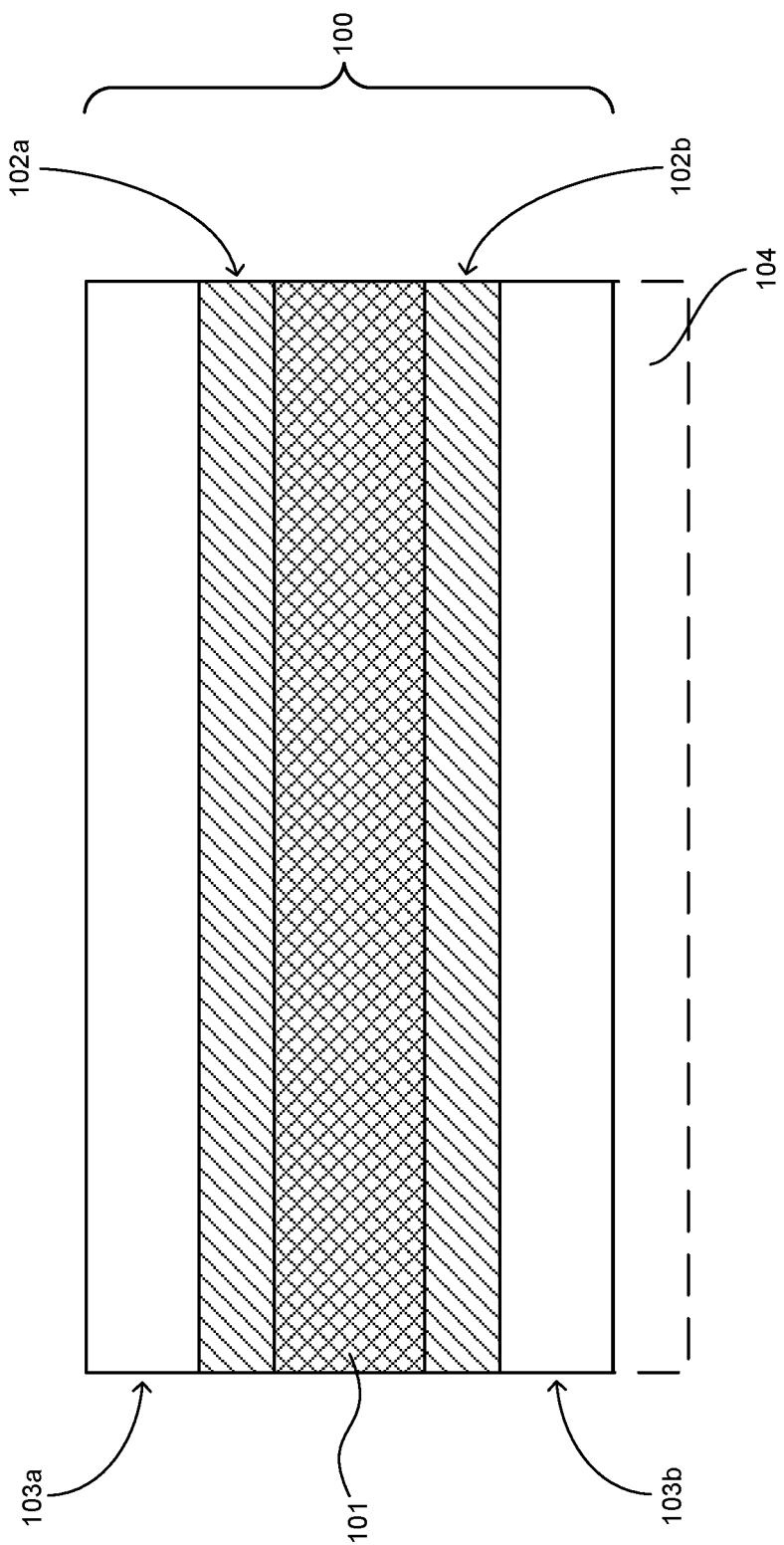
FIG. 1 shows a cross-sectional view of a multilayer release liner according to one embodiment.

While the specification concludes with the claims particularly pointing out and distinctly claiming the invention, it is believed that the invention described herein will be better understood from the following description. The invention described herein can comprise (open ended) or consist essentially of the components of the invention described herein as well as other ingredients or elements described herein. Throughout the entire specification, including the claims, the word "comprise" and variations of the word, such as "comprising" and "comprises," as well as "have," "having," "includes," "include," and "including," and variations thereof, means that the named steps, elements or materials to which it refers are essential, but other steps, elements, or materials may be added and still form a construct with the scope of the claim or disclosure. When recited in describing the invention and in a claim, it means that the invention and what is claimed is considered to what follows and potentially more. These terms, particularly when applied to claims, are inclusive or open-ended and do not exclude additional, unrecited elements or methods steps. The term "between" as used in connection with a range includes the endpoints unless the context suggests otherwise. Terms such as "about, "generally", "substantially", and the like are to be construed as modifying a term or value such that it is not an absolute. Such terms will be defined by the circumstances and the terms that they modify as those terms are understood by those of skill in the art. This includes, at the very least, the degree of expected experimental error, technique error and instrument error for a given technique used to measure a value.

The term "stable" is used interchangeably with "shelf-stable" and "long term shelf-life" herein and means that the multilayer release liner and silicone release coating of a self-adhering roofing remain adhered to the roofing material of the self-adhering roofing system for at least 1 month, more preferably 3 months and most preferably for at least 6 months at room temperature.

The phrase "silicone compatible" as used herein means that when the multilayer release liner is tested in accordance with the silicone compatibility test described below in Example 1, the amount of extraction of silicone is less than 10%, preferably less than 5%, or alternatively from about 0.1% to about 10%, preferably from about 0.1% to about 5%; more preferably from about 0.1% to about 3%.

The phrase "minimize oil migration" used herein means that when the multilayer release liner is tested in accordance with the oil migration test described below in Example 2, no visible discoloration of the multilayer release liner is present.

The phrase "roofing material" as used herein means the combination of a roofing membrane and roofing adhesive that is permanently applied to a roof.

The term "polyethylene terephthalate" is used interchangeably with the term "PET" and with the phrases "PET polymer" and "PET material" as used herein.

The phrase "non-PET material" is used interchangeably with "non-PET polymer" and refers to any polymer, additive, or other chemical species which is not PET.

Multilayer Release Liner

As shown in FIG. 1, in one embodiment, the multilayer release liner 100 has at least five layers, not including a silicone release coating 104. The core layer 101 includes PET. The core layer 101 has a first side and a second side. A first tie layer 102a is disposed on the first side of the core layer 101 and a second tie layer 102b is disposed on the second side of the core layer 101. The multilayer release liner 100 also includes at least two polyolefin layers 103a, 103b. A first polyolefin layer 103a is disposed on the first tie layer 102a and a second polyolefin layer 103b is disposed on the second tie layer 102b.

Figure 2:
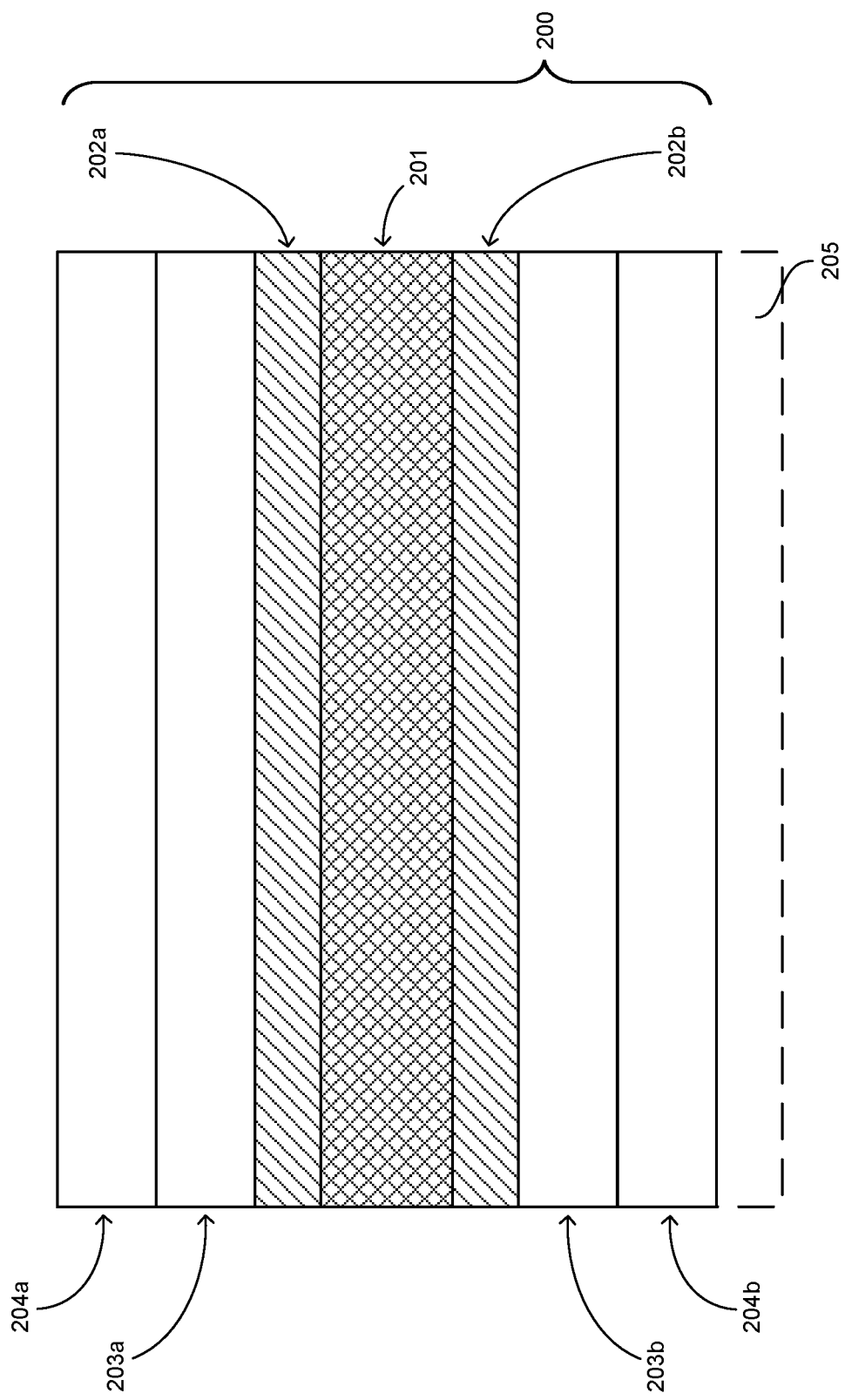
FIG. 2 shows a cross-sectional view of a multilayer release liner according to another embodiment.

As shown in FIG. 2, in another embodiment, the multilayer release liner 200 has at least seven layers, not including a silicone release coating 205. The core layer 201 includes PET. The core layer 201 has a first side and a second side. A first tie layer 202a is disposed on the first side of the core layer 201 and a second tie layer 202b is disposed on the second side of the core layer 201. The multilayer release liner 200 also includes at least two polyolefin layers 203a, 203b, and optionally an additive. A first polyolefin layer 203a is disposed on the first tie layer 202a and a second polyolefin layer 203b is disposed on the second tie layer 202b. The multilayer release liner 200 further comprises third and fourth polyolefin layers 204a, 204b. A third polyolefin layer 204a is disposed on the first polyolefin layer and a fourth polyolefin layer 204b is disposed on the second polyolefin layer.

Figure 3:
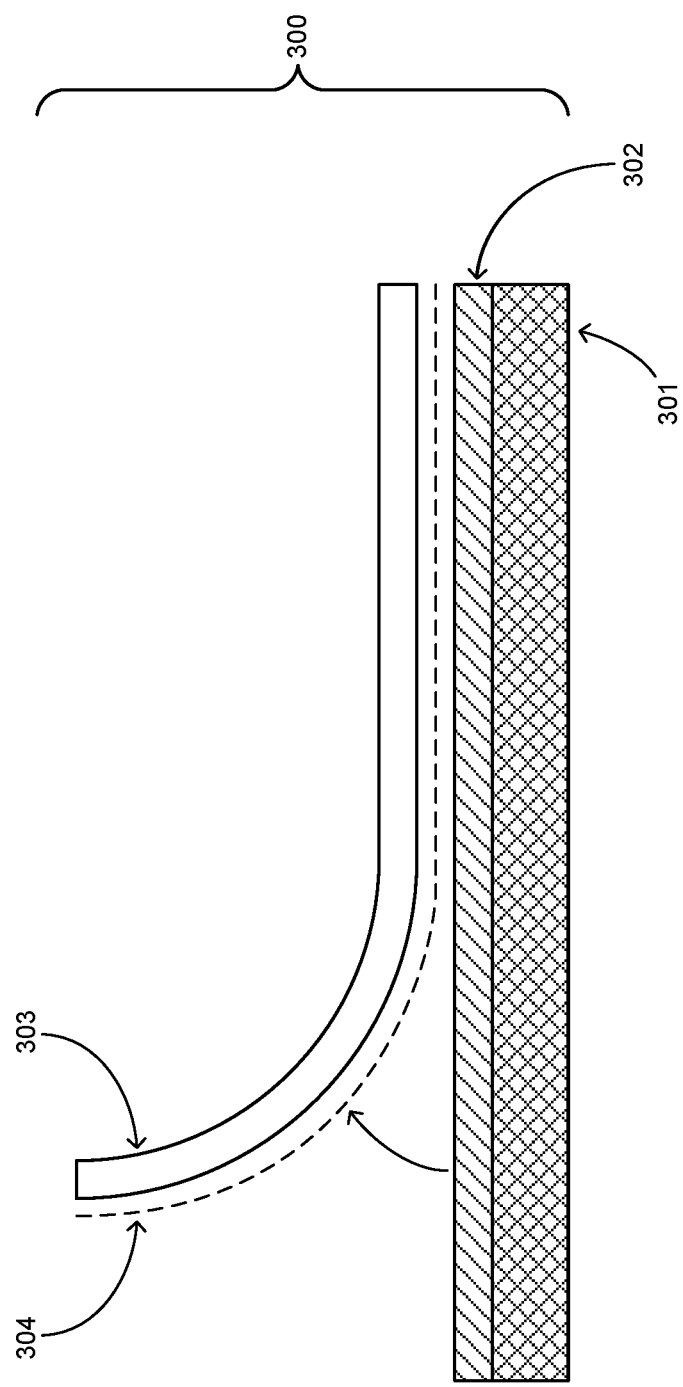
FIG. 3 shows a cross-sectional view of a roofing system including the multilayer release liner and a silicone release coating.

As shown in FIG. 3, in yet another embodiment, the multilayer release liner is configured to be incorporated into a self-adhering roofing system 300. The self-adhering roofing system comprises a roofing membrane 301, a petroleum based adhesive 302, a multilayer release liner 303, and a silicone release coating 304. In this embodiment, the petroleum based adhesive 302 is coated on one side of the roofing membrane 301. The silicone release coating 304 is disposed on one side of the multilayer release liner and is configured to contact the petroleum based adhesive 302 so that the multilayer release liner 303 and silicone release coating 304 can be peeled off from the petroleum based adhesive 302 and the roofing membrane 301. After the multilayer release liner 303 and the attached silicone release coating 304 are removed, the roofing membrane 301 can be adhered to a roof using adhesive 302.

The multilayer release liner may have a thickness of about 25 microns (μm) to about 2500 microns (μm), preferably about 25 microns to about 100 microns, and most preferably about 25 microns to about 30 microns, not including the silicone release coating.

Core Layer

The core layer functions as a barrier layer and is impermeable to gases, water, other liquids, ultraviolet (UV) radiation, and oils from the asphalt roofing adhesive. The core layer acts as a barrier both to prevent outside contaminants from contacting the roofing material and also to prevent the compounds of the roofing material from polluting the outside environment. Particularly, in the interim between production of a roofing system and installation of the roofing material, the core layer protects the roofing material from the harmful effects of weather, rain, sunlight, construction solvents, paints and other debris. Similarly, the core layer also functions as a barrier to minimize oil migration and release of odors from the asphalt adhesive into the surrounding environment. This barrier function is particularly important because the roofing systems may be stored at construction sites or out of doors before installation.

In particular, the core layer minimizes oil migration from the asphalt roofing adhesive into the multilayer release liner, and allows the multilayer release liner to be shelf-stable for at least 1 month, more preferably 3 months, and most preferably for at least 6 months at room temperature, without any resulting discoloration of the liner.

Furthermore, the core layer provides for a multilayer release liner which is highly silicone compatible. The core layer is designed to allow for effective silicone adhesion and cure on the surface of the multilayer release liner in order to form a silicone release coating.

In some embodiments, the core layer is mainly made up of PET. In a preferred embodiment, the core layer consists only of PET polymer, and the core layer does not include any colorants, additives, or non-PET polymers.

In some embodiments, it may be necessary or desirable to include additives or non-PET polymers into the core layer in order to optimize the overall function of the multilayer release liner. Accordingly, in some embodiments, the core layer is made up of at least 50 wt % PET, more preferably at least 75 wt % PET, even more preferably at least 90 wt %

PET, or most preferably at least 95 wt % PET. Thus the PET content of the core layer may be within a range of about 50 wt % to about 100 wt %, about 75 wt % to about 100 wt %, about 90 wt % to about 100 wt %, or about 95 wt % to about 100 wt %. In a preferred embodiment, the core layer consists solely of PET. A core layer having 50 wt % or more of non-PET materials may be a less effective barrier layer and may be less capable of maintaining shelf-stability and preventing oil migration over time.

The PET may be any grade or type of PET that is capable of being extruded, including, but not limited to, a PET copolymer, glycol-modified PET (PETG) or isophthalic acid modified PET. An exemplary PET polymer is DAK Americas Laser+C 9921.

The thickness of the core layer is preferably within a range of from about 1 to about 10 microns (μm), more preferably from about 3 to about 5 microns (μm). A thickness of the core layer is preferably within a range of about 4% to about 40%, more preferably about 11% to about 20% of the thickness of the multilayer release liner. A ratio of the thickness of the core layer to the thickness of the polyolefin layers is preferably within the range of from about 0.1 to about 1, more preferably from about 0.3 to about 0.5. Such percentages and ratios are advantageous because they optimize the amount of PET material used in the core layer in order to minimize cost, while still providing an effective barrier function and maintaining shelf-life.

Tie Layers

In a preferred embodiment, the multilayer release liner contains two or more tie layers. The tie layers are used to bind the core layer of the multilayer release liner to two or more polyolefin layers. Thus, tie layers act as an adhesive interface between the PET of the core layer and any adjacent polyolefin layers. Therefore, it is most preferred that a tie layer is always disposed between the core layer and any polyolefin layer.

The core layer and the two or more polyolefin layers of the liner are each selected for their unique beneficial properties. For example, they may be selected for their strength, flexibility, silicone compatibility, durability, or gas and liquid barrier functions. However, while these layers may each impart a useful property, such different or dissimilar materials may be incompatible with one another and therefore have difficulty adhering to each other. This may result in delamination or a film with poor mechanical properties. To prevent these undesirable results and to increase strength and durability of the multilayer release liner, the tie layers are carefully selected to be compatible with both the core layer and the adjacent polyolefin layer, in order to improve adhesion between them.

According to an embodiment, a tie layer comprises at least one tie resin. In another embodiment, a tie layer consists of a single tie resin. In a preferred embodiment, the tie layer may be a polyolefin compound carefully selected for its compatibility with both the materials of the core layer and the materials of the adjacent polyolefin layer. Alternatively, the tie layer may be any other tie resin known in the art to improve adhesion between incompatible layers of a laminate or multilayer composite. Such compounds are typically polyethylene copolymers of polar or nonpolar repeating units. Examples of tie resins include, without limitation, ethylene-vinyl acetate (EVA), ethylene-methyl acrylate (EMA, EMAC), ethylene-acrylic acid (EAA), or functionalized polymers such as but not limited topolyolefin-grafted maleic anhydride (MaH-PE, AMP), ethylene-methyl acrylate grafted maleic anhydride (Mah-EMAC). In one embodiment, all tie layers used in the multilayer release liner may consist of the same tie resin. In another embodiment, different tie layers used in the multilayer release liner may be formed of different tie resins so that each tie layer may be uniquely tailored to maximize compatibility and adhesion between the two layers that it binds together. In one embodiment, the tie layer does not include an additive. Mixing an additive with a tie resin may undesirably decrease the bonding strength of the tie layer.

The thickness of each tie layer is preferably within the range of about 1 to about 10 microns (μm), more preferably about 3 to about 5 microns (μm). A thickness of all the tie layers combined is preferably within the range of about 4% to about 40%, preferably about 11% to about 20% of the thickness of the multilayer release liner. A ratio of the thickness of the tie layers to the thickness of the polyolefin layers is preferably within the range of about 0.1 to about 1, preferably about 0.3 to about 0.5. A ratio of the thickness of the tie layers to the thickness of the core layer is preferably within the range of about 0.5 to about 1, more preferably about 0.5 to about 0.6.

Polyolefin Layers

In a preferred embodiment, the multilayer release liner contains at least two outer layers comprising a polyolefin. Such a polyolefin layer is advantageous because its polyolefin content allows it to be flexible, strong, impermeable to gas and liquids, and chemically inert. These features allow the multilayer release liner to effectively protect the roofing material while also preventing oil and odor migration from the asphalt adhesive of the roofing material into the liner and the surrounding atmosphere.

According to an embodiment, the multilayer release liner has at least two polyolefin layers. The polyolefin may preferably be polypropylene (PP), high density polyethylene (HDPE), low density polyethylene (LDPE), linear low density polyethylene (LLDPE), medium density polyethylene (MDPE), polystyrene (PS), polymethylpentene (PMP), or polybutene-1 (PB-1). Optionally, the polyolefin may also be a polyolefin elastomer such as polyisobutene, ethylene propylene rubber, ethylene propylene diene monomer (EPDM) rubber and thermoplastic polyolefin (TPO). The polyolefin is preferably an impact polypropylene copolymer (iPP). The polyolefin layers may contain only one type of polyolefin or alternatively, a mixture of two or more polyolefins.

In another embodiment, the polyolefin layers further comprise additives such as, a filler, a colorant, a stabilizer, a processing agent, and an antiblocking agent. In some embodiments, the polyolefin layers do not include additives such as a reinforcing fiber, a coupling agent, a plasticizer, a flame retardant, a peroxide, or an antistat. In particular, in some embodiments it is desirable to avoid the use of an antistat because such an additive may interfere with silicone cure. In one embodiment, the additive may be a colorant, such as Ingenia Polymers IP1024 White Concentrate pigment, or any other suitable colorant. Additives may be present in amounts from 1 to 40 percent by weight based on the total weight of the polyolefin layer.

The thickness of the polyolefin layers is preferably within the range of about 6 to about 20 microns (μm), more preferably about 7 to about 10 microns (μm). A thickness of all the polyolefin layers combined is preferably within the range of about 25% to about 50%, more preferably from about 30% to about 40% of the thickness of the multilayer release liner.

The polyolefin layers are highly compatible with silicone. The components of the polyolefin layers are selected and designed to allow silicone adhesion and cure on the surface of the multilayer release liner in order to form a silicone release coating.

Silicone Release Coating

According an embodiment, an outer layer of the multilayer release liner is coated with a silicone composition to form a silicone release coating. This silicone release coating allows the multilayer release liner to temporarily adhere to the asphalt adhesive of a roofing material, thereby forming a self-adhering roofing system. This roofing system can be sold to users with the multilayer release liner attached to the roofing material so that the roofing material is protected and so that the asphalt adhesive of the roofing material does not leak, smear, or stain its packaging or other objects. The silicone release coating also allows the multilayer release liner to be peeled off of the roofing material when a user is ready to apply the roofing material to a roof. As shown in FIG. 3, the silicone release coating 304 is configured to adhere more strongly to the multilayer release liner 303 than to the asphalt adhesive 302, so that the release liner 300 and silicone release coating 304 may be easily and cleanly separated from the roofing material, while remaining firmly attached to the multilayer release liner.

The silicone composition of the silicone release coating may include any silicone compound known in the art, but preferably comprises a polysiloxane polymer such as one of polydialkylsiloxanes, polyalkylaryl siloxanes, preferably polydimethylsiloxanes, or mixtures thereof.

In a preferred embodiment, the silicone composition may further include a vinyl or hexenyl functional silicone polymer, a silicon-hydride functional crosslinker, a maleate functional alcohol to inhibit the reaction, and a platinum catalyst.

The silicone compound is preferably cured and crosslinked to form a continuous polymer silicone release coating. Appropriate silicone compounds should adhere strongly to the multilayer release liner, but release easily and cleanly from the asphalt adhesive of the roofing material. The thickness of the silicone release coating is preferably within the range of about 1 to about 5 microns (μm), more preferably about 1 to about 3 microns (μm).

In one embodiment, the silicone release coating applied to the multilayer release liner does not contain microparticles. The silicone release coating of this embodiment is configured to release effectively from an asphalt adhesive without the need for microparticles.

Method of Production of Multilayer Release Liner

In order to produce the multilayer release liner, in a preferred embodiment, all layers of the multilayer release liner are coextruded in a blown film process. Thus, in a preferred embodiment, the core layer, tie layers, and polyolefin layers are extruded together in order to form the multilayer release liner.

A silicone composition is then coated onto one surface of the multilayer release liner in a separate step. In a preferred embodiment, the silicone composition is applied in an even layer using a roll coating process. The layer of silicone composition is then cured using heat, UV light, or electron-beam radiation (EB) in order to convert it into a silicone release coating. The curing process is conducted over the course of about 1 to about 60 seconds, or more preferably about 1 to about 30 seconds, or even more preferably about 1 to about 15 seconds, or most preferably about 1 to about 5 seconds. In a preferred embodiment, curing is conducted for no more than 5 seconds.

EXAMPLES

The following examples illustrate some embodiments and properties of the embodiments.

Example 1—Silicone Cure Test of the Multilayer Release Liner

A silicone composition was prepared by mixing Dow Corning Syl-off 7680-012 (vinyl functional polymer), ethynylcyclohexanol (ETCH) of (ECH) inhibitor, silicon-hydride functional crosslinker, and a platinum catalyst. A layer of the silicone composition was coated on the outer surface of a sample of multilayer release liner. This coating was done using a three roll offset gravure process. The layer of silicone composition was then cured using heat to produce a silicone release coating. The curing process proceeded under a platinum catalyzed reaction at elevated temperatures greater than 150° F. conditions for 4 seconds. The weight per area of the silicone release coating was then measured using x-ray fluorescence (XRF) to obtain the initial coat weight. The silicone coated sample of the multilayer release coating was then immersed in toluene for 1 hour and the coat weight was re-measured. The difference in initial and post-immersion coat weights was then divided by the initial coat weight. This number was then multiplied by 100 to obtain the percentage of extractable silicone in the silicone release coating. This test was performed once as a control, with sample of multilayer release liner that did not include a core layer of any kind. The test was then conducted with samples of the multilayer release liner described in Example 3, which includes a PET core layer. Finally, the test was conducted with samples of a multilayer release liner having a nylon core layer. These samples were produced as described in Example 3 except that they have core layers consisting of nylon and tie layers consisting of Tymax GT 7000, which was selected for its greater compatibility with nylon. The results of these five tests are shown in Table 1.

TABLE 1

| | % Extractions |
|---|---|
| MTI Control | 2.3% |
| Nylon 612 | 22.4% |
| Nylon 66/6 | 27.1% |
| Nylon 66/6I6T | 10.5% |
| PET | 2.3% |

As shown in Table 1 above, the PET core layer sample performed significantly better than the nylon core layer samples, showing reduced percentages of extractable silicone, indicating better cure of the silicone release coating.

Example 2—Oil Migration Test of the Multilayer Release Liner

A multilayer release liner having the structure and composition described in Example 3 was tested for its effectiveness as an oil barrier. The multilayer release liner was coated in a silicone composition to form a silicone release coating as described in Example 1 and then applied to a roofing membrane as shown in FIG. 3 to produce a roofing system. Self-adhering roofing systems are stored at ambient temperature. However, to test the efficacy of the core layer of the multilayer release liner as an oil barrier, a sample of the roofing system was placed in a 160° F. oven for 1 week. After the sample was removed from the oven, the multilayer release liner was cooled and visually inspected for discoloration. No visible discoloration was present when the multilayer release liner was viewed from the side not configured to contact the roofing membrane. These results indicate that multilayer release liner is effective as an oil barrier to remain shelf-stable for a period of at least 1-6 months at room temperature, while in contact with a roofing membrane.

Example 3—Exemplary Multilayer Release Liner

A multilayer release liner having seven layers was produced in a coextrusion process. The multilayer release liner included a core layer consisting of PET, having a first side and a second side. The PET used was Laser+C 9921 PET (produced by DAK Americas). A first tie layer consisting of Tymax GT 7058 Tie Resin (produced by Westlake Chemical) was provided on the first side of the core layer. A second tie layer consisting of Tymax GT 7058 Tie Resin (produced by Westlake Chemical) was provided on the second side of the core layer. A first polyolefin layer was disposed on the first tie layer and a second polyolefin layer was disposed on the second tie layer. Both the first and second polyolefin layers had a composition of 80 wt % CM015G iPP (produced by Phillips 66) and 20 wt % IP 1024 white colorant (produced by Ingenia Polymers). A third polyolefin layer was disposed on the first polyolefin layer and a fourth polyolefin layer was disposed on the second polyolefin layer. The third and fourth polyolefin layers consisted of CM015G iPP (produced by Phillips 66).

The invention claimed is:

1. A multilayer release liner for a roofing material, comprising:
    a core layer comprising polyethylene terephthalate (PET) having a first side and a second side;
    a first tie layer disposed upon the first side of the core layer and a second tie layer disposed upon the second side of the core layer;
    a first polyolefin layer disposed on the first tie layer and a second polyolefin layer disposed on the second tie layer; and
    a third polyolefin layer disposed on top of the first polyolefin layer and a fourth polyolefin layer disposed on top of the second polyolefin layer;
    wherein the PET is present in the core layer in an amount of at least 50 wt % based on the total weight of the core layer.

2. The multilayer release liner of claim 1, wherein the PET is present in the core layer in an amount of at least 95 wt % based on the total weight of the core layer.

3. The multilayer release liner of claim 1, wherein the core layer consists of PET.

4. The multilayer release liner of claim 1, wherein the core layer minimizes oil migration.

5. The multilayer release liner of claim 1, wherein a thickness of the core layer is within a range of about 4% to about 40% of a thickness of the multilayer release liner.

6. The multilayer release liner of claim 1, wherein a thickness of all of the tie layers combined is within a range of about 4% to about 40% of the thickness of the multilayer release liner.

7. The multilayer release liner of claim 1, wherein at least polyolefin layers further comprises an additive.

8. The multilayer release liner of claim 7, wherein the additive is selected from the group consisting of a filler, a colorant, a stabilizer, a processing agent, and an antiblocking agent.

9. The multilayer release liner of claim 1, wherein the polyolefin layers do not include a reinforcing fiber, a coupling agent, a plasticizer, a flame retardant, a peroxide, or an antistat.

10. The multilayer release liner of claim 1, wherein a thickness of all of the polyolefin layers combined is within a range of about 25% to about 50% of the thickness of the multilayer release liner.

11. The multilayer release liner of claim 1, wherein the multilayer release liner is silicone compatible.

12. A self-adhering roofing system comprising a multilayer release liner, a roofing material, and a silicone release coating,
    wherein the multilayer release liner comprises:
    a core layer comprising polyethylene terephthalate (PET) having a first side and a second side;
    a first tie layer disposed upon the first side of the core layer and a second tie layer disposed upon the second side of the core layer; and
    a first polyolefin layer disposed on the first tie layer and a second polyolefin layer disposed on the second tie layer;
    wherein the PET is present in the core layer in an amount of at least 50 wt % based on the total weight of the core layer.

13. The self-adhering roofing system of claim 12, wherein the self-adhering roofing system is shelf-stable for at least 6 months at room temperature.

14. The self-adhering roofing system of claim 12, wherein the silicone release coating does not contain microparticles.

15. The self-adhering roofing system of claim 12, wherein a thickness of the silicone release coating is within the range of about 1 to about 5 microns ($\mu m$).

* * * * *